United States Patent
Badi et al.

(10) Patent No.: US 8,190,794 B2
(45) Date of Patent: May 29, 2012

(54) CONTROL FUNCTION FOR MEMORY BASED BUFFERS

(75) Inventors: Eric Louis Pierre Badi, Cagnes-sur-Mer (FR); Laurent Le Faucheur, Antibes (FR)

(73) Assignee: Texas Instruments Incorporated, Dallas, TX (US)

( * ) Notice: Subject to any disclaimer, the term of this patent is extended or adjusted under 35 U.S.C. 154(b) by 7 days.

(21) Appl. No.: 12/608,958

(22) Filed: Oct. 29, 2009

(65) Prior Publication Data

US 2011/0093629 A1   Apr. 21, 2011

(30) Foreign Application Priority Data

Oct. 21, 2009   (EP) .................................... 09290806

(51) Int. Cl.
*G06F 5/00* (2006.01)
*G06F 13/00* (2006.01)

(52) U.S. Cl. ................. 710/52; 710/22; 710/5; 710/308

(58) Field of Classification Search .................. 710/5–6, 710/52–57, 22–28, 308–310
See application file for complete search history.

(56) References Cited

U.S. PATENT DOCUMENTS

| | | | | |
|---|---|---|---|---|
| 6,112,267 A * | 8/2000 | McCormack et al. | ........... | 710/52 |
| 6,363,438 B1 * | 3/2002 | Williams et al. | ................ | 710/22 |
| 6,868,458 B2 * | 3/2005 | Kim | ................................ | 710/28 |
| 7,054,986 B2 * | 5/2006 | Zhao et al. | ......... | 710/310 |
| 7,680,963 B2 * | 3/2010 | Go et al. | ........................ | 710/22 |
| 7,865,632 B2 * | 1/2011 | Goh | ................................ | 710/22 |
| 2006/0075208 A1 * | 4/2006 | Jones et al. | .................... | 711/217 |
| 2008/0005405 A1 * | 1/2008 | Innis et al. | ........................ | 710/56 |

* cited by examiner

*Primary Examiner* — Christopher B Shin
(74) *Attorney, Agent, or Firm* — Ronald O. Neerings; Wade James Brady, III; Frederick J. Telecky, Jr.

(57) ABSTRACT

Instantiating a plurality of buffers in a random access memory by storing in the random access memory (RAM) a plurality of descriptors each containing a base address, at least one address pointer and a size to define a corresponding one of the plurality of buffers. Transferring data in any one of the plurality of buffers by using a control function within an accessing module to generate a buffer address by accessing and updating the address pointer in the corresponding descriptor. In a processor that accesses the circular buffers, the control function is one or more complex instructions tailored for computing read and write addresses to access the circular buffer using fields within the corresponding descriptor. In a DMA module that accesses the circular buffers, the control function is a hardware controller that computes read and write addresses using the fields within the corresponding descriptor to access the circular buffer.

20 Claims, 3 Drawing Sheets

US 8,190,794 B2

CONTROL FUNCTION FOR MEMORY BASED BUFFERS

CLAIM OF PRIORITY UNDER 35 USC 119

The present application claims priority to European Patent Application No. 09290806.0, entitled "Control Function for Memory Based Buffers," that was filed Oct. 21, 2009 and is incorporated by reference herein in its entirety.

FIELD OF THE INVENTION

This invention generally relates to the field of circular type data buffers for a computer processor, and in particular to the control of multiple memory based first-in, first-out (FIFO) type buffers.

BACKGROUND OF THE INVENTION

In some application, there is a need to use a FIFO to support communication between a processor and another processor or a functional module such as a direct memory access (DMA) controller, which is typically implemented in hardware. Typically, the FIFO management is fully implemented in hardware. The processor and/or the DMA may push data into the FIFO and pop data from the FIFO data by reading and writing at a same read address and write address. The descriptors that control the accessing of data within the FIFO are maintained in registers that are embedded within the FIFO control logic. The control logic updates the descriptors in response to read and write accesses to the read and write address of the FIFO by the processor and/or DMA. The control logic determines when the FIFO is empty or full and provides status indicators of the current state of the FIFO.

In some applications, several FIFOs may be needed. In order to reduce the amount of hardware required for the FIFO controllers, the descriptors of the FIFO may be located in a portion of the processors memory to save area. In this arrangement, the processor needs to access the memory to update the pointers when it makes an access to the FIFO. The sequence of generic processor instructions is quite long, as follows:
Extract the size, the base address, R/W pointers, etc fields from the FIFO descriptor;
Compute the read or the write pointer in the SRAM;
Check if the FIFO is full for a write operation or empty for a read operation
Compute the new read and write pointer with a circular addressing scheme;
Compute the number of elements in the FIFO to process according to a threshold; and
Save the result in memory.

However, executing this complex sequence of generic processor instructions each time a piece of data is written to or read from the FIFO requires a large number of execution cycles by the processor which may impinge on other tasks being performed by the processor.

BRIEF DESCRIPTION OF THE DRAWINGS

Particular embodiments in accordance with the invention will now be described, by way of example only, and with reference to the accompanying drawings.

DETAILED DESCRIPTION OF EMBODIMENTS OF THE INVENTION

A system may share one or more memory based FIFOs between one or more processors and one or more logic functions such as a direct memory access (DMA) controller used to move data from a peripheral device, for example, to system memory. In this manner, data can be rapidly transferred between the processor(s) and the peripheral device. In order to access the FIFO, the processors may include FIFO control function based on FIFO instructions and the DMA may embody a FIFO control function based on a hardware controller that performs the following:
loads a FIFO descriptor into an internal register(s) used by the hardware controller;
Extracts the empty bit from the descriptor into a register;
Returns the amount of elements in the FIFO that is used as a threshold to process the elements of the FIFO; and
Computes the absolute read pointer or write pointer of the FIFO in an address register.

In this manner, a DMA controller containing a single FIFO control function may access and manage a large number of memory based FIFO buffers, thereby saving power and real estate in a low power integrated circuit.

In a multiprocessor system in which one or more memory based FIFOs are shared between two or more processors, each processor may include the FIFO instructions described above and execute them to manage the shared FIFO(s) using the descriptors stored in shared memory.

Depending on the application, the number of FIFOs needed may be large and the various FIFOs may have various sizes. Therefore, in an embodiment of the invention, the FIFO descriptors are stored in a portion of the random access memory used by the processor and managed by a control function within the processor to access the descriptors in memory and to calculate an updated circular address in the FIFO buffer.

Figure 1:
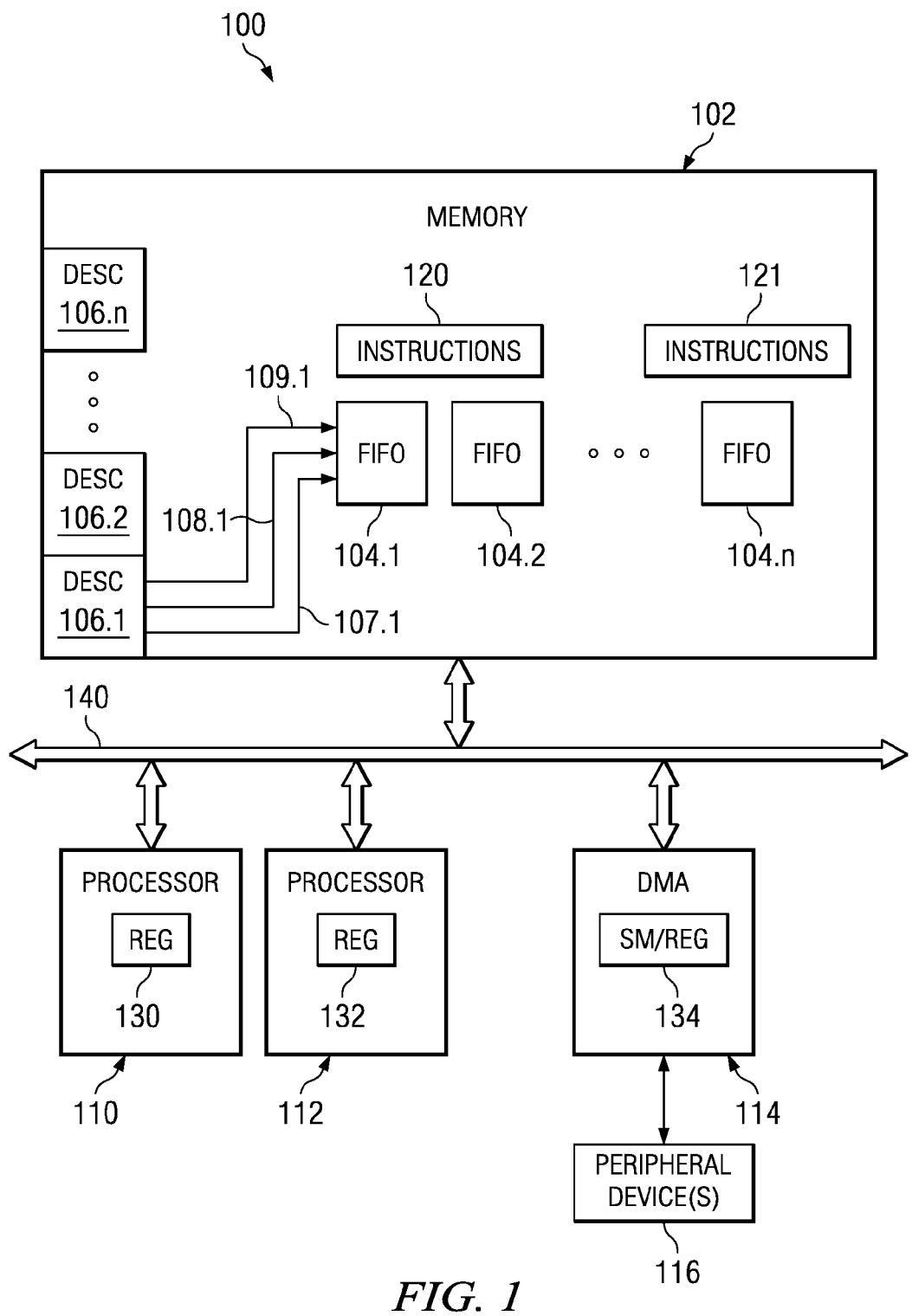
FIG. 1 is an illustrative block diagram of a system that embodies a FIFO control function for memory based FIFOs.

FIG. 1 is an illustrative block diagram of a system 100 that embodies a FIFO control function for memory based FIFOs 104.1-104.n. System 100 includes two processors 110, 112 that execute various programs and applications from memory 102 via bus 140, such as program 120 and program 121. Direct memory access (DMA) controller 114 transfers data from one or more peripherals 116 directly to memory 102 via bus 140. System 100 is merely exemplary of one embodiment of the invention. Various combinations of one or more processors, one or more DMA controllers, and one or more peripherals may be combined in various combinations using one or more interconnect buses such as bus 140, as is well known. In some embodiments, a DMA controller may not be included. The general operation of processors for executing streams of instructions is well known and is not described further herein. Likewise, the general operation of DMA controllers and their movement of data between memory and peripherals is well known and is not descried further herein. In various embodiments, memory 102 may be a single block of memory, or multiple blocks of memory that may be configured for optimum use by the processors and DMA controllers.

Multiple circular type buffers 104.1-104.n are located in memory 102. These buffers may be various sized and are each defined by an associated descriptor 106.1-106.*n* that are also located in memory 102. Each descriptor contains various fields that completely describe the configuration of its associated buffer. For example, descriptor 106.1 includes a base address pointer 107.1 that points to the first address of buffer 104.1 in memory 102. Descriptor 106.1 also includes a read pointer 108.1 that points to the current read location in buffer 104.1 and a write pointer 109.1 that points the current write location in buffer 104.1. Descriptor 106.1 also includes a size field that defines the total size of buffer 104.1. Descriptor 106.1 also includes various status and control bits used to define the operation of buffer 104.1.

Buffers 104.1-104.*n* are typically first-in, first-out (FIFO) buffers. However, other configurations, such as, last-in, first-out (LIFO) may also be supported. One or more bits in the descriptor may indicate the configuration of the buffer.

Each processor 110, 112 and DMA controller 114 may access a particular descriptor for an associated buffer and by examining and operating on the descriptor determine where to read data from the associated buffer or where to write date to the associated buffer. In this manner, a large number of circular type buffers may be instantiated in memory 102 with no additional controller cost, other than just the amount of memory used.

In order to minimize processing time for each access to a location in the circular buffers, processor 110 may use a control function embodied in one or more complex instructions that performs a portion of the processing required to access the buffer. The control function in processor 110 reduces the number generic instructions that must be executed to perform the descriptor processing. For example, in one embodiment a complex buffer-address-computation instruction is defined that computes a new state of the buffer by computing a read or write address for circular addressing of the buffer in the RAM from the base address field, the read or write pointer fields and the size field from the descriptor. It also determines if the buffer is full or empty, and indicates when the buffer is full or empty by setting a status bit in the descriptor. In one embodiment, this single complex instruction may access the contents of the designated descriptor directly in memory 102 and then process the fields.

In another embodiment, the descriptor evaluation instruction may assume the contents of the descriptor have been transferred to one or more registers 130 within processor 110 by another instruction and process the descriptor fields by accessing the register(s). In this case, a second complex descriptor-copy instruction may be defined that accesses a designated descriptor in memory 102 and loads the descriptor fields into one or more registers within processor 110 for use by the descriptor evaluation instruction.

In this manner, processor 110 may access any one of the buffers 104.1-104.*n* by executing only a few complex instructions. Likewise, processor 112 may include similar complex instructions for fetching and processing the buffer descriptors using internal registers 132.

DMA controller 114 may embody a control function to generate a buffer address by accessing and updating the address pointer in the corresponding descriptor in memory 102. A state machine and registers 134 are configured to access a designated descriptor in memory 102 and store the contents into register(s) 134. State machine 134 computes a new state of the buffer by computing a read or write address for circular addressing of the buffer in the RAM from the base address field, the read or write pointer fields and the size field from the descriptor in registers 134. It also determines if the buffer is full or empty, and indicates when the buffer is full or empty by setting a status bit in the descriptor. As each data is transferred to or from the buffer, state machine 134 computes a new state with updated address pointer. At the completion of sequence of data transfers, state machine 134 updates the descriptor in memory 102 with the current state of the buffer.

In this manner, DMA 114 may access any one of the buffers 104.1-104.*n* by using a control function embodied by state machine and registers 134. Each peripheral 116 may be allocated one or more buffers 104.1-104.*n*. When a peripheral requests a data transfer, control function 134 accesses the descriptor for the buffer allocated to the requesting peripheral.

Figure 2:
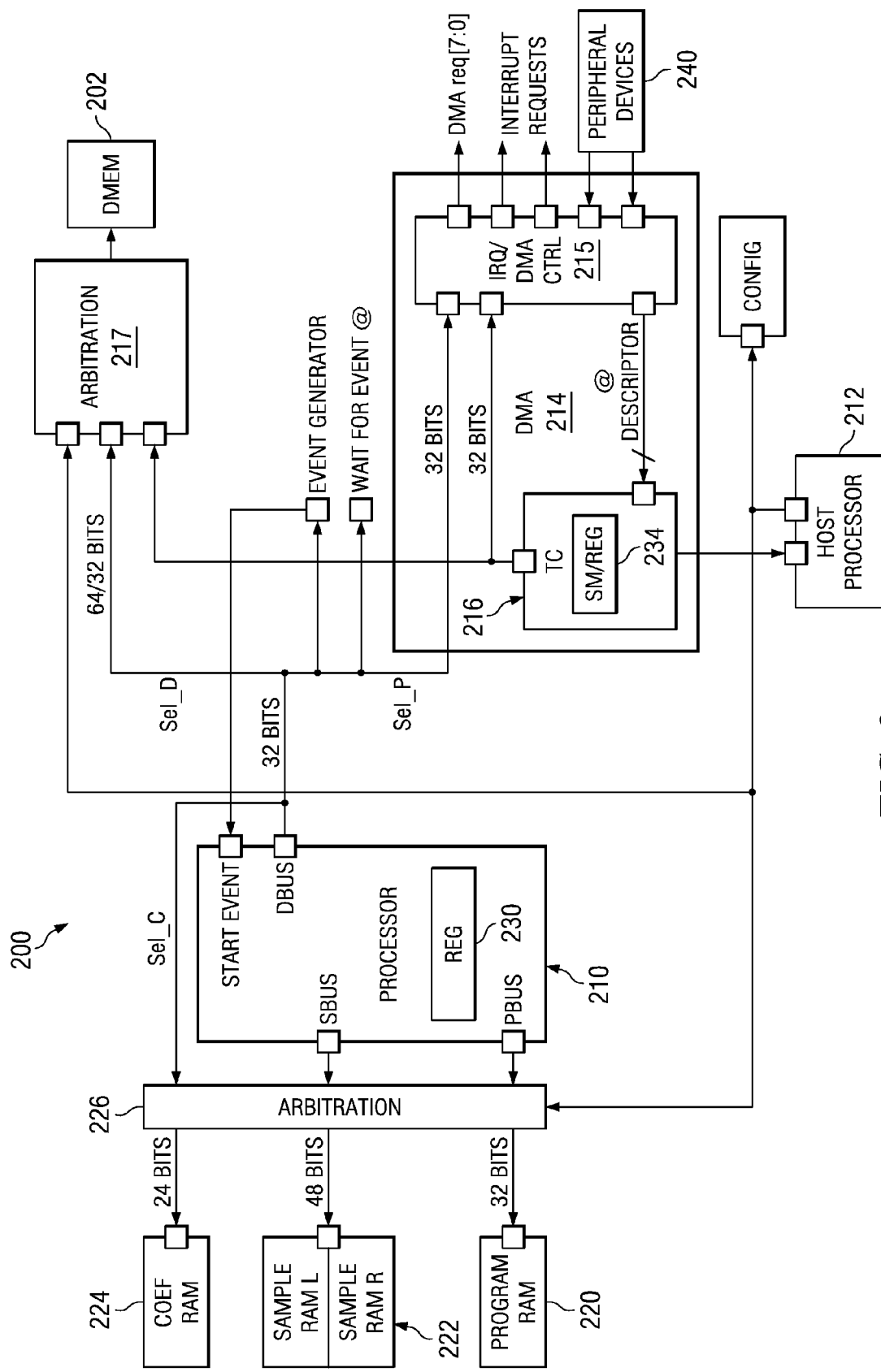
FIG. 2 is a block diagram of another embodiment of a system that embodies a FIFO control function for memory based FIFOs.

FIG. 2 is a block diagram of another embodiment of a system 200 that embodies a FIFO control function for memory based FIFOs. In system 200, memory 202 holds the buffers and their associated descriptors. Processor 210 includes a buffer control function for accessing the buffers via arbitration module 217. DMA 214 includes a buffer control function 234 for accessing the buffers via arbitration module 217. The arbitration module schedules accesses to memory 202 by processor 210, host processor 212, and DMA 214. In this embodiment, while processor 210 is accessing a descriptor, arbitration module 217 gives the processor exclusive access to the descriptor.

Traffic controller 216 within DMA 214 performs accesses to a descriptor in response to an @descriptor address provided by DMA controller 215 and stores the accessed descriptor in registers 234 within TC 216. Each peripheral device is assigned one or more buffers. In response to access requests from peripheral devices 240, state machine 234 computes a new state for the buffer assigned to the requesting peripheral device by computing a read or write address for circular addressing of the buffer in the RAM from the base address field, the read or write pointer fields and the size field from the descriptor in registers 234. It also determines if the buffer is full or empty, and indicates when the buffer is full or empty by setting a status bit in the descriptor. As each data is transferred to or from the buffer, state machine 234 computes a new state with updated address pointer. At the completion of sequence of data transfers, state machine 234 updates the descriptor in memory 202 with the current state of the buffer.

Processor 210 is a digital signal processor and executes program instructions from program memory 240. In this embodiment, processor 210 processes audio data samples and coefficients for performing signal processing from sample memory 222 and coefficient memory 224. Arbitration module 226 arbitrates accesses to the various memories from signal processor 210 and host processor 212. Signal processor 210 is given priority over host processor 212.

Signal processor 210 uses a control function embodied in two complex instructions that perform a major portion of the processing required to access the buffers in memory 202. A complex descriptor-copy instruction is defined that accesses a designated descriptor in memory 202 and loads the descriptor fields into one or more registers 230 within processor 210 for use by a descriptor evaluation instruction. A buffer-address-computation instruction is defined to compute a new state of the buffer by computing a read or write address for circular addressing of the buffer in the RAM from the base address field, the read or write pointer fields and the size field from the descriptor fields now in registers 230. It also determines if the buffer is full or empty, and indicates when the buffer is full or empty by setting a status bit in the descriptor.

In this manner, processor 210 may access any one of the set of buffers in memory 202 by executing only a few complex instructions. Likewise, host processor 212 may include similar complex instructions for fetching and processing the buffer descriptors, but typically it will just use a sequence of generic instructions since it does not access the buffers in memory 202 in a frequent manner.

The operation of the FIFO control function will now be described in more detail. In this embodiment, sixty-four FIFO buffers are arranged in buffer memory 202. Each of the sixty-four associated descriptors in this embodiment is 64 bits wide and are also stored in buffer memory 202. As mentioned above, there are two complex instructions that provide the FIFO control function: one that directly loads the data of the FIFO descriptor (LDDESC) into internal registers 230; and one that loads the address pointer and modifies the descriptor (LDAMDESC) to compute the new state of the FIFO by updating the address pointer.

LDDESC loads a FIFO descriptor into two internal registers 230 used by the processor. LDAMDESC performs the following steps:
Extracts the empty bit from the descriptor into a register;
Returns the amount of elements in the FIFO that is used as a threshold to process the elements of the FIFO;
Computes the absolute read pointer or write pointer of the FIFO in an address register; and
updates empty/full status.

The circular buffers capabilities in this exemplary embodiment are as follows: Max size: 128 words of 32 bits (512 bytes); Min size: four words of 32 bits (16 bytes). This means that the circular buffers may occupy between 16 bytes up to 32 KB. The descriptors of the circular buffers are located in the DMEM RAM 202. The system supports up to 64 descriptors. Each descriptor can be associated with any DMA request by a mapping table in DMA controller 214. The descriptor length is 64-bits aligned and can be accessed by the TC in one cycle. The location of the descriptors starts at the address "0" of the DMEM memory. An exemplary descriptor used in this embodiment is enumerated in Table 1.

TABLE 1

Descriptor example

| Bits | size | R/W | Name | Function | |
|---|---|---|---|---|---|
| LSB 8 | 7 | RW | READ | Read pointer absolute address | DESC0 |
| | 1 | — | | reserved | |
| 16 | 7 | RW | SIZE | Circular buffer size | |
| | 1 | RW | IRQ | IRQ destination (0 DSP, 1 MCU) | |
| | 1 | RW | ERR | Report buffer access errors | |
| | 5 | — | | reserved | |
| | 1 | RW | DIR | Circular buffer direction 0 => in 1 => out | |
| | 1 | R | FLE | Circular buffer empty 1 => empty | |
| 8 | 7 | RW | WRITE | Write pointer absolute address | |
| | 1 | — | | reserved | |
| 32 | 12 | RW | BASE | Base address | DESC1 |
| | 7 | RW | ITER | Iteration | |
| | 6 | RW | SRC | Source ID peripheral If 0 => DMEM access | |
| | 6 | RW | DST | Destination ID peripheral If 0 => DMEM Access | |
| MSB | 1 | — | | reserved | |

Referring to Table 1, the Read pointer and write pointer are located in the low 32-bits of the descriptor (DESC0) and the base address is located in the high 32-bits (DESC01). The iteration field indicates the number of 32 bits data transfers from/to same location identified by Source ID and Destination ID fields. The 12-bit base address allows addressing the 64 KBytes of the DMEM. The TC addresses the DMEM through 32 data bits and the address of the circular buffer are aligned on its own size. The circular buffer size is at least four words, therefore 12 bits are enough to address the 64 KBytes (4096*4*4 bytes). In other embodiments, the pointer size may be larger or smaller to accommodate a different amount of buffer space.

The LDAMDESC instruction loads an address register within processor 210 with the computed read or write address from the registers DESC0/DESC1. Status register bit Rs1 is returned loaded with the amount of used data in the FIFO; status register bit Rs2 is loaded with the FLE flag. An address register AM is loaded from the shifted base address and either the read or the write index, depending on the RW field. Operation of the LDAMDESC instruction is illustrated by pseudo-code in Table 2.

TABLE 2 pseudo code for LDAMDESC FIFO instruction

```
MAXx    = DESC0.SIZE
BMx     = (DESC1.BASE << 2)
INCx    = 1
If (RW = = 0)
        IAMx    = DESC0.READ
Else
        IAMx    = DESC0.WRITE
Endif
AMx = BMx + IAMx
MAXx = SIZE
If (DESC0.WRITE >= DESC0.READ)
        Rs1 = DESC0.WRITE – DESC0.READ
Else
        Rs1 = DESC0.SIZE – DESC0.READ + DESC0.WRITE
Endif
Rs2 = DESC0.FLE
```

When the source or the destination field is set to zero the transfer includes the DMEM memory, in this case the base address is associated with the source or destination depending on field setting. If source and destination field are filled with a value except zero then the transfer will be done between two peripherals. All descriptors have to be initialized before starting any TC transfer. If not used, the descriptor activation field bit must be set to 0.

When the descriptor corresponds to a transfer from DMEM to the peripheral, the read pointer is incremented using circular addressing. It is the responsibility of the DMA FIFO control function to update the corresponding write pointer. When the TC detects a FIFO described by DESC0/1 is empty the read pointer does not move and a Null sample is sent instead. In the situation of transfers from peripherals to DMEM, the situation is similar: Signal processor 210 must update the read pointer using the FIFO complex instructions and the write pointer is updated by the TC 216 using the FIFO control function 234. The combination of LDDESC and the next instruction LD_AMDESC allows a fast loading of the circular pointers either for doing read data move from DMEM to SMEM or a write move in the other direction.

Figure 3:
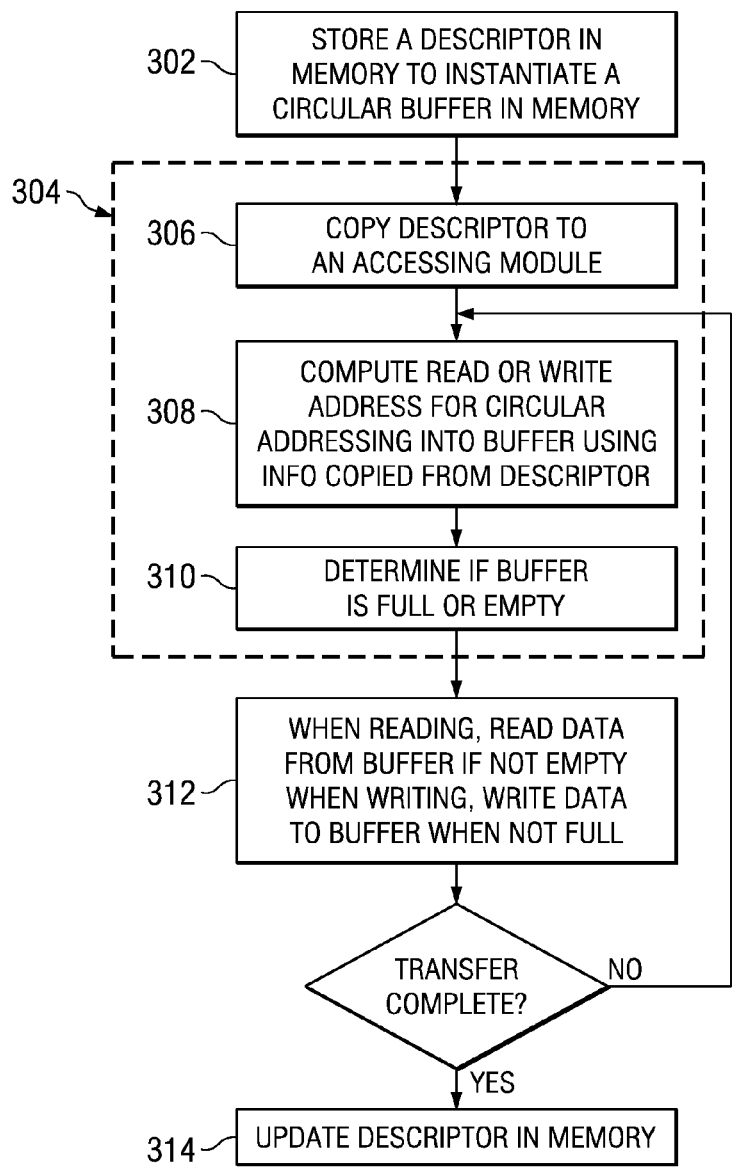
FIG. 3 is a flow diagram illustrating operation of a FIFO control function for memory based FIFOs.

FIG. 3 is a flow diagram illustrating operation of a FIFO control function for memory based FIFOs, as described above. One or more descriptors are stored 302 in a random access memory (RAM) that each contain at least one address pointer and a size to instantiate a corresponding one or more circular type buffers in the RAM. In one embodiment, the descriptors are formatted according to Table 1, and the descriptors and the circular buffers are located within a 64 KByte region of the RAM, such that a 12 bit address pointer is sufficient. Data is transferred to one of the plurality of buffers by using a control function 304 within an accessing module to generate a buffer address by accessing and updating the address pointer in the corresponding descriptor in the RAM. As described in more detail above, the control function may be implemented as one or a few complex instructions that are executed by a processor that is accessing the circular buffer, or the control function may be implemented as a state machine or other type of control module within a functional module that is accessing the circular buffer.

The control function accesses the descriptor in memory and stores 306 the base address field, the at least one pointer fields and the size field respectively in internal registers of the accessing device. A read or write address is computed 308 by the accessing device for circular addressing of the buffer in the RAM from a base address field, pointer fields and a size field in the descriptor. As the address is being computed, the accessing device also determines 310 if the buffer is full or empty and indicates when the buffer is full or empty. In some embodiments that include sufficiently fast memory, the control function may access the descriptor directly in memory and not copy the contents to a local register for address pointer computation.

After determining the current pointer address, the accessing device then reads 312 data from the buffer at the computed address if the buffer is not empty or writes 312 data to the computed address if the buffer is not full. The process of computing 308 an updated pointer is repeated until the transfer is completed, and then the descriptor in memory is updated 314 so that another device can access it for data transfers by the other device.

Other Embodiments

While the invention has been described with reference to illustrative embodiments, this description is not intended to be construed in a limiting sense. Various other embodiments of the invention will be apparent to persons skilled in the art upon reference to this description. For example, a larger or smaller number of buffers and larger size buffers may be supported by modifying the size of the fields within the descriptor.

The data width of the buffer may be varied for different embodiments. The buffers illustrated herein are organized and addressed as 32 bit words. Other embodiments may be organized as 8 bit, 16 bit, 64 bit, or any particular size useful for a given embodiment.

The control function may be implemented as one or more executable instructions, as a state machine, as firmware, as synchronous or asynchronous custom control logic, or any other form of control logic capable of performing the operations described herein. When implemented as an instruction(s) for execution by a processor, the instruction(s) may be executed within the processor by performing a series of microinstructions, by invoking a state machine, by invoking synchronous or asynchronous custom control logic, or by any other form of control logic capable of performing the operations described herein.

Although the invention finds particular application to systems using Digital Signal Processors (DSPs), implemented, for example, in an Application Specific Integrated Circuit (ASIC), it also finds application to other forms of processors. An ASIC may contain one or more megacells which each include custom designed functional circuits combined with pre-designed functional circuits provided by a design library.

An embodiment of the invention may include a system with a processor coupled to a computer readable medium in which a software program is stored that contains instructions that when executed by the processor perform the functions of modules and circuits described herein. The computer readable medium may be memory storage such as dynamic random access memory (DRAM), static RAM (SRAM), read only memory (ROM), Programmable ROM (PROM), erasable PROM (EPROM) or other similar types of memory. The computer readable media may also be in the form of magnetic, optical, semiconductor or other types of discs or other portable memory devices that can be used to distribute the software for downloading to a system for execution by a processor. The computer readable media may also be in the form of magnetic, optical, semiconductor or other types of disc unit coupled to a system that can store the software for downloading or for direct execution by a processor As used herein, the terms "applied," "connected," and "connection" mean electrically connected, including where additional elements may be in the electrical connection path. "Associated" means a controlling relationship, such as a memory resource that is controlled by an associated port. The terms assert, assertion, de-assert, de-assertion, negate and negation are used to avoid confusion when dealing with a mixture of active high and active low signals. Assert and assertion are used to indicate that a signal is rendered active, or logically true. De-assert, de-assertion, negate, and negation are used to indicate that a signal is rendered inactive, or logically false.

It is therefore contemplated that the appended claims will cover any such modifications of the embodiments as fall within the true scope and spirit of the invention.

What is claimed is:

1. A method for operating a plurality of buffers in a random access memory coupled to a processor, the method comprising:
storing in the random access memory (RAM) a plurality of descriptors each containing a base address, at least one address pointer and a size to define a corresponding one of the plurality of buffers in the RAM; and
transferring data in any one of the plurality of buffers by the processor using a buffer-address-computation instruction of the processor, wherein the processor executes the buffer-address-computation instruction by:
computing a read or write address for circular addressing of a location within a selected one of the plurality buffers from the base address field, pointer fields and the size field in the corresponding descriptor;
determining if the buffer is full or empty; and
indicating when the buffer is full or empty.

2. The method of claim 1, wherein the plurality of descriptors and the corresponding plurality of buffers comprise at least sixty four buffers.

3. The method of claim 2, wherein the processor further comprises a descriptor-copy instruction executed by the processor, wherein the processor executes the descriptor-copy instruction by accessing the descriptor in memory and storing the base address field, the at least one pointer field and the size field in internal registers of the processor for use by the buffer-address-computation instruction.

4. The digital system of claim 3, wherein the processor is further configured to access the circular buffer by executing a read or a write instruction by accessing a location in the circular buffer using the read or write address computed by the buffer-address-computation instruction.

5. The method of claim 3, wherein one or more of the plurality of buffers is a first-in, first-out buffer.

6. The method of claim 1,
further comprising accessing any one of the plurality of buffers in the RAM by another logic module coupled to the RAM by:

computing a read or write address for circular addressing of the buffer in the RAM from a base address field, pointer field and a size field in the corresponding descriptor in the RAM;

determining if the buffer is full or empty; and indicating when the buffer is full or empty.

7. The method of claim 6, wherein the logic module is configured to:

read data from the buffer at the computed read address when the buffer is not empty; and write data to the buffer at the computed write address when the buffer is not full.

8. The method of claim 7, wherein the logic module is further configured to read a zero value from the buffer at the computed read address when the buffer is empty.

9. The method of claim 7, further comprising copying the corresponding descriptor to one or more local registers within the logic module by a control function within the logic module for computing the read or write address.

10. The method of claim 6, wherein the logic module is a direct memory access module.

11. The method of claim 6, wherein one or more of the plurality of buffers is a first-in, first-out buffer.

12. A digital system, comprising:

a processor configured to execute instructions stored in a program memory coupled to the processor, wherein the processor is configured to access a circular buffer located in a random access memory (RAM) coupled to the processor and defined by a corresponding descriptor located in the RAM by executing a buffer-address-computation instruction after fetching it from the program memory and decoding it by:

computing a read or write address for circular addressing of a location in the buffer from a base address field, pointer fields and a size field in the corresponding descriptor;

determining if the buffer is full or empty; and indicating when the buffer is full or empty.

13. The digital system of claim 12, wherein the processor is further configured to access the circular buffer by executing a descriptor-copy instruction after fetching it from the program memory by accessing the corresponding descriptor in the RAM and storing the base address field, the pointer fields and the size field in internal registers of the processor for use by the buffer-address-computation instruction.

14. The digital system of claim 12, wherein the processor is further configured to access the circular buffer by executing a read or a write instruction after fetching it from the program memory by accessing a location in the circular buffer using the read or write address computed by the buffer-address-computation instruction.

15. A digital system, comprising:

a processor coupled to a random access memory (RAM), the processor configured to instantiate a plurality of circular buffers in the RAM by initializing a corresponding plurality of descriptors located in the RAM;

an access module coupled to the RAM and coupled to a data device that generates or consumes data, the access module configured to transfer data between the circular buffers located in the RAM and the data device, the access module comprising a control function, wherein the control function is configured to:

compute a read or write address for circular addressing of a location in any one of the buffers from a base address field, pointer fields and a size field in the corresponding descriptor;

determine if the buffer is full or empty; and indicate when the buffer is full or empty.

16. The digital system of claim 15, wherein the control function is further configured to access the corresponding descriptor in the RAM and store the base address field, the pointer fields and the size field in one or more local registers within the logic module for computing the read or write address.

17. The digital system of claim 15, wherein the access module is further configured to:

read data from the buffer at the computed read address when the buffer is not empty and transfer the data to the data device;

read a zero value from the buffer at the computed read address when the buffer is empty; and write data transferred from the data device to the buffer at the computed write address when the buffer is not full.

18. The digital system of claim 15, wherein the processor is configured to transfer data to the plurality of circular buffers by executing a buffer-address-computation instruction after fetching it from a program memory coupled to the processor by:

computing a read or write address for circular addressing of a location in the buffer from a base address field, pointer fields and a size field in the corresponding descriptor;

determining if the buffer is full or empty; and indicating when the buffer is full or empty.

19. The digital system of claim 18, wherein the processor is further configured to access the circular buffer by executing a descriptor-copy instruction after fetching it from the program memory by accessing the corresponding descriptor in the RAM and storing the base address field, the pointer fields and the size field in internal registers of the processor for use by the buffer-address-computation instruction.

20. The digital system of claim 19, wherein the processor is further configured to access the circular buffer by executing a read or a write instruction after fetching it from the program memory by accessing a location in the circular buffer using the read or write address computed by the buffer-address-computation instruction.

* * * * *